United States Patent
Weidmann et al.

(10) Patent No.: US 10,717,803 B2
(45) Date of Patent: Jul. 21, 2020

(54) BLOCK COPOLYMER

(71) Applicant: SIKA TECHNOLOGY AG, Baar (CH)

(72) Inventors: Jürg Weidmann, Greifensee (CH); Lukas Frunz, Dietlikon (CH); Jörg Zimmermann, Winterthur (CH)

(73) Assignee: SIKA TECHNOLOGY AG, Baar (CH)

( * ) Notice: Subject to any disclaimer, the term of this patent is extended or adjusted under 35 U.S.C. 154(b) by 1 day.

(21) Appl. No.: 15/125,382

(22) PCT Filed: Mar. 27, 2015

(86) PCT No.: PCT/EP2015/056730
§ 371 (c)(1),
(2) Date: Sep. 12, 2016

(87) PCT Pub. No.: WO2015/144886
PCT Pub. Date: Oct. 1, 2015

(65) Prior Publication Data
US 2017/0073449 A1    Mar. 16, 2017

(30) Foreign Application Priority Data
Mar. 27, 2014    (EP) .................................... 14162090

(51) Int. Cl.
*C08F 293/00*    (2006.01)
*C04B 24/26*    (2006.01)
(Continued)

(52) U.S. Cl.
CPC ........ *C08F 293/005* (2013.01); *C04B 24/165* (2013.01); *C04B 24/246* (2013.01);
(Continued)

(58) Field of Classification Search
CPC . C08F 293/005; C04B 24/165; C04B 24/246; C04B 28/02; C04B 24/2647
See application file for complete search history.

(56) References Cited

U.S. PATENT DOCUMENTS

2005/0228142 A1* 10/2005 Kraus ................. C08F 293/005
                                                                525/329.7
2007/0073022 A1*  3/2007 Yuasa ................. C04B 24/2647
                                                                526/317.1
(Continued)

FOREIGN PATENT DOCUMENTS

EP    0619277 A1    10/1994
EP    1138697 A1    10/2001
(Continued)

OTHER PUBLICATIONS

Oct. 6, 2016 International Preliminary Report on Patentability issued in International Patent Application No. PCT/EP2015/056730.
(Continued)

*Primary Examiner* — John E Uselding
(74) *Attorney, Agent, or Firm* — Oliff PLC

(57) ABSTRACT

A block copolymer, in particular for use as a dispersant for mineral binder compositions, including at least one first block A and at least one second block B, wherein the first block A has a monomer unit M1 and the second block B has a monomer unit M2. To this end a proportion of monomer units M2 which is in any case present in the first block A is less than 25 mol %, in particular less than or equal to 10 mol %, based on all the monomer units M1 in the first block A and a proportion of monomer units M1 which is in any case present in the second block B is less than 25 mol %, in particular less than or equal to 10 mol %, based on all the monomer units M2 in the second block B.

21 Claims, 1 Drawing Sheet

(51) Int. Cl.
    *C04B 28/02* (2006.01)
    *C04B 24/24* (2006.01)
    *C04B 24/16* (2006.01)
    C04B 103/00 (2006.01)
    C04B 103/40 (2006.01)

(52) U.S. Cl.
    CPC .......... *C04B 24/2647* (2013.01); *C04B 28/02* (2013.01); *C04B 2103/0061* (2013.01); *C04B 2103/408* (2013.01); *C08F 2438/03* (2013.01)

(56) References Cited

U.S. PATENT DOCUMENTS

| | | | | |
|---|---|---|---|---|
| 2011/0046269 | A1* | 2/2011 | Yuasa | C04B 24/2647 524/5 |
| 2011/0142951 | A1* | 6/2011 | Johnson | A61K 9/0019 424/501 |
| 2011/0245422 | A1* | 10/2011 | Disson | C08L 75/04 525/89 |
| 2013/0303663 | A1* | 11/2013 | Agnely | C04B 24/2641 524/5 |

FOREIGN PATENT DOCUMENTS

| | | |
|---|---|---|
| EP | 1767555 A2 | 3/2007 |
| FR | 2969156 A1 | 6/2012 |
| JP | H7-503990 A | 4/1995 |
| JP | 2007-119736 A | 5/2007 |
| JP | 2011-522070 A | 7/2011 |
| JP | 2012-533651 A | 12/2012 |
| WO | 93/17057 A1 | 9/1993 |
| WO | 2004/016668 A1 | 2/2004 |
| WO | 2009/140429 A2 | 11/2009 |
| WO | 2009/140432 A2 | 11/2009 |
| WO | 2011/008810 A1 | 1/2011 |

OTHER PUBLICATIONS

Oct. 6, 2016 Office Action issued in Colombian Patent Application No. NC2016/0002500.
Sep. 1, 2015 International Search Report issued in International Patent Application No. PCT/EP2015/056730.
Jun. 14, 2018 Office Action issued in Chinese Application No. 201580016552.4.
Sep. 23, 2018 Office Action issued in Colombian Application No. 2016/0002500.
Nov. 13, 2018 Office Action issued in Japanese Patent Application No. 2016-558327.
Feb. 26, 2019 Office Action issued in Chinese Application No. 201580016552.4.
May 28, 2019 Office Action issued in Japanese Patent Application No. 2016-558327.
Oct. 17, 2019 Office Action issued in Colombian Patent Application No. NC2016/0002500.

* cited by examiner

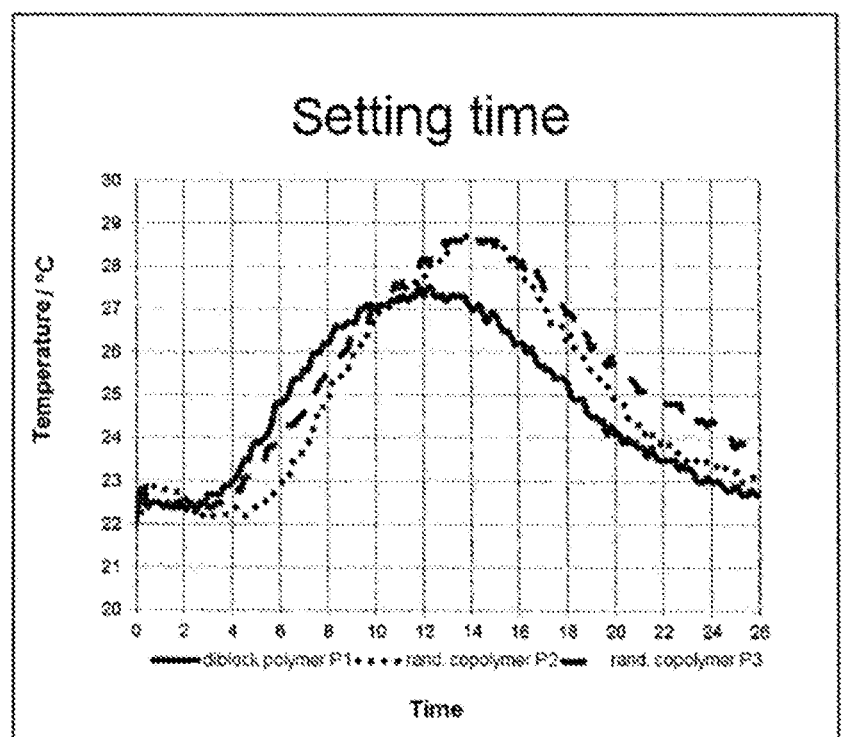

BLOCK COPOLYMER

TECHNICAL FIELD

The invention relates to a block copolymer, in particular for use as a dispersant for mineral binder compositions. The invention further pertains to a process for preparing a corresponding block copolymer and to the use of the block copolymer as a dispersant. In another aspect, the invention is concerned with a mineral binder composition comprising the block copolymer, and also with a shaped article produced from the composition.

PRIOR ART

Dispersants or flow agents are employed in the construction industry as plasticizers or water-reducing agents for mineral binder compositions, such as concrete, mortars, cements, plasters, and lime, for example. Dispersants are generally organic polymers, which are added to the tempering water or are admixed in solid form to the binder compositions. As a result, both the consistency of the binder composition during working, and the properties in the fully cured state, can be advantageously modified.

Examples of particularly effective dispersants known are polycarboxylate-based comb polymers. These comb polymers possess a polymer backbone with side chains attached to it. Corresponding polymers are described for example in EP 1 138 697 A1 (Sika AG).

While they are very effective, such comb polymers do have to be added at relatively high levels in some cases, depending on application. Aside from the economic drawbacks, these high doses may also undesirably affect the setting behavior of binder compositions. In particular, known comb polymers may disadvantageously extend the setting time.

The unwanted effects of the comb polymers can in fact be compensated by combination of further admixtures, examples being accelerators, at least in part. Such solutions, however, are usually complicated in application and are expensive.

There therefore continues to be a need for improved dispersants which do not have the stated disadvantages.

SUMMARY OF THE INVENTION

It is an object of the present invention, therefore, to provide an improved dispersant, in particular for mineral binder compositions. The dispersant is intended in particular to allow effective plasticizing and effective processing of mineral binder compositions. In particular, the dispersant is to have as little adverse effect as possible on the setting behavior. It is desirable, moreover, for the dispersant to be able to be produced very flexibly and with great control.

Surprisingly it has been found that this object can be achieved by the features of independent claim 1.

At the core of the invention, accordingly, is a block copolymer, in particular for use as a dispersant for mineral binder compositions, which comprises at least one first block A and at least one second block B, the first block A having a monomer unit M1 of the formula I (as defined further on), and the second block B containing a monomer unit M2 of the formula II (as defined further on), where any fraction of monomer units M1 present in the first block A is less than 25 mol %, more particularly less than or equal to 10 mol %, based on all the monomer units M1 in the first block A, and where any fraction of monomer units M1 present in the second block B is less than 25 mol %, more particularly less than or equal to 10 mol %, based on all the monomer units M2 in the second block B.

As it has emerged, in comparison with known dispersants, block copolymers of this kind on the one hand produce very good plasticizing effects in mineral binder compositions, and on the other hand the setting behavior is affected to less of an extent. Moreover, such block copolymers can be prepared in an efficient process in a wide variety of modifications and in a reliable way. The block copolymers of the invention, therefore, can be produced very flexibly and with control.

Further aspects of the invention are subjects of further independent claims. Particularly preferred embodiments of the invention are subjects of the dependent claims.

Certain Embodiments of the Invention

A first aspect of the invention relates to a block copolymer, in particular for use as a dispersant for mineral binder compositions, comprising at least one first block A and at least one second block B, the first block A having a monomer unit M1 of the formula I,

and the second block B containing a monomer unit M2 of the formula (II)

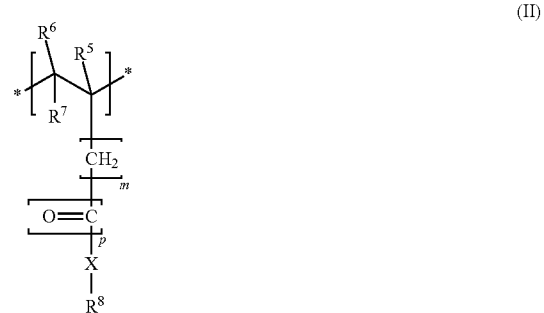

where $R^1$, in each case independently of any other, is —COOM, —SO$_2$-OM, —O—PO(OM)$_2$ and/or —PO(OM)$_2$, $R^2$, $R^3$, $R^5$ and $R^6$, each independently of one another, are H or an alkyl group having 1 to 5 carbon atoms, $R^4$ and $R^7$, each independently of one another, are H, —COOM or an alkyl group having 1 to 5 carbon atoms, or where $R^1$ with $R^4$ forms a ring to —CO—O—CO—, (anhydride), M, in each case independently of any other, is H$^+$, an alkali metal ion, an alkaline earth metal ion, a di- or trivalent metal ion, an ammonium ion or an organic ammonium group;

m=0, 1 or 2, p=0 or 1,

X, in each case independently of any other, is —O— or —NH—, $R^8$ is a group of the formula —[AO]$_n$—R$^a$, where A=$C_2$— to $C_4$-alkylene, $R^a$ is H, or a $C_1$— to $C_{20}$-alkyl group, -cyclohexyl group or -alkylaryl group, and n=2-250, more particularly 10-200;
and where any fraction of monomer units M2 present in the first block A is less than 25 mol %, more particularly less than or equal to 10 mol %, based on all the monomer units M1 in the first block A, and where any fraction of monomer units M1 present in the second block B is less than 25 mol %, more particularly less than or equal to 10 mol %, based on all the monomer units M2 in the second block B.

In the block copolymer of the invention there may be two or more different monomer units M1 of the formula I and/or two or more different monomer units M2 of the formula II.

The monomer units M1 and any further monomer units in the first block A are present, in particular, in statistical or random distribution. Likewise the monomer units M2 and any further monomer units in the second block B are present, in particular, in statistical or random distribution.

In other words, the at least one block A and/or the at least one block B are/is present preferably in each case as a part-polymer with random monomer distribution.

The at least one first block A comprises advantageously 5-70, more particularly 7-40, preferably 10-25, monomer units M1 and/or the at least one second block B comprises 5-70, more particularly 7-40, preferably 10-25, monomer units M2.

According to a further preferred embodiment, the first block A comprises 25-35 monomer units M1 and/or the at least one second block B comprises 10-20 monomer units M2.

The block copolymer as a whole has a weight-average molecular weight $M_w$ in particular in the range of 10 000-150 000 g/mol, advantageously 15 000-80 000. In the present context, molecular weights, such as the weight-average molecular weight $M_w$, are determined by gel permeation chromatography (GPC) with polyethylene glycol (PEG) as standard. This technique is known per se to the person skilled in the art.

Preferably any fraction of monomer units M2 present in the first block A is less than 15 mol %, more particularly less than 10 mol %, especially less than 5 mol % or less than 1 mol %, based on all the monomer units M1 in the first block A. Moreover, any fraction of monomer units M1 present in the second block B is advantageously less than 15 mol %, more particularly less than 10 mol %, especially less than 5 mol % or less than 1 mol %, based on all the monomer units M2 in the second block B. With advantage both conditions are met in unison.

With especial advantage, for example, any fraction of monomer units M2 present in the first block A is less than 15 mol % (based on all the monomer units M1 in the first block A) and any fraction of monomer units M1 present in the second block B is less than 10 mol % (based on all the monomer units M2 in the second block B).

Substantially, therefore, the monomer units M1 and M2 are physically separate, this being to the benefit of the dispersing effect of the block copolymer and being advantageous in relation to the delay problem.

Based on all the monomer units in the first block A, the first block A consists in particular to an extent of at least 20 mol %, more particularly at least 50 mol %, especially at least 75 mol % or at least 90 mol %, of monomer units M1 of the formula I. Based on all the monomer units in the second block B, the second block B consists advantageously to an extent of at least 20 mol %, more particularly at least 50 mol %, especially at least 75 mol % or at least 90 mol %, of monomer units M2 of the formula II.

In the block copolymer, the molar ratio of the monomer units M1 to the monomer units M2 is situated in particular in the range of 0.5-6, more particularly 0.7-4, preferably 0.9-3.8, more preferably 1.0-3.7 or 2-3.5. As a result, an optimum dispersant effect in mineral binder compositions is achieved.

Particularly in the case of a molar ratio of the monomer units M1 to the monomer units M2 in the range of 1.5-6, preferably 1.8-5 or 2-3.5, the dispersing effect achieved in mineral binder compositions is good and at the same time particularly long-lasting.

For specific applications, however, different molar ratios may be advantageous.

Especially advantageous block copolymers are those for which: $R^1$=COOM; $R^2$ and $R^5$, in each case independently of one another, are H, —$CH_3$ or mixtures thereof; $R^3$ and $R^6$ in each case independently of one another are H or —$CH_3$, preferably H; $R^4$ and $R^7$ in each case independently of one another are H or —COOM, preferably H.

In particular $R^1$=COOM, $R^2$=H or $CH_3$, and $R^3$=$R^4$=H. Hence the block copolymer can be prepared on the basis of acrylic or methacrylic acid monomers, this being of interest from an economic standpoint. In the present context, moreover, with the block copolymers of this kind, there is a good dispersing effect in conjunction with little delay to the setting time.

Likewise advantageous may be block copolymers where $R^1$=COOM, $R^2$=H, $R^3$=H, and $R^4$=COOM. Comb polymers of this kind can be prepared on the basis of maleic acid monomers.

The group X in monomer unit M2 is advantageously —O— (=oxygen atom) for at least 75 mol %, more particularly for at least 90 mol %, especially for at least 95 mol % or at least 99 mol %, of all monomer units M2.

Advantageously $R^5$=H or $CH_3$, $R^6$=$R^7$=H, and X=—O—. Block copolymers of this kind can be prepared, for example, starting from (meth)acrylic esters, vinyl ethers, (meth)allyl ethers or isoprenol ethers.

In the case of one particularly advantageous embodiment, $R^2$ and $R^5$ are each mixtures of 40-60 mol % H and 40-60 mol % —$CH_3$.

According to a further advantageous embodiment, $R^1$=COOM, $R^2$=H, $R^5$=—$CH_3$, and $R^3$=$R^4$=$R^6$=$R^7$=H.

In the case of another advantageous embodiment $R^1$=COOM, $R^2$=$R^5$=H or —$CH_3$, and $R^3$=$R^4$=$R^6$=$R^7$=H.

The radical $R^8$ in monomer unit M2, based on all the radicals $R^8$ in the block copolymer, consists in particular to an extent of at least 50 mol %, more particularly at least 75 mol %, preferably at least 95 mol % or at least 99 mol %, of a polyethylene oxide. A fraction of ethylene oxide units, based on all the alkylene oxide units in the block copolymer, is more particularly more than 75 mol %, more particularly more than 90 mol %, preferably more than 95 mol %, and especially 100 mol %.

In particular, $R^8$ has substantially no hydrophobic groups, more particularly no alkylene oxides having three or more carbon atoms. This means more particularly that a fraction of alkylene oxides having three or more carbon atoms, based on all the alkylene oxides, is less than 5 mol %, more particularly less than 2 mol %, preferably less than 1 mol % or less than 0.1 mol %. In particular there are no alkylene oxides having three or more carbon atoms present, or the fraction thereof is 0 mol %.

$R^a$ advantageously is H and/or a methyl group. With particular advantage, $A=C_2$-alkylene and $R^a$ is H or a methyl group.

In particular the parameter n=10-150, preferably n=15-100, more preferably n=17-70, especially n=19-45 or n=20-25. In particular in the stated preference ranges, excellent dispersing effects are obtained as a result.

It may, further, be advantageous if the block copolymer comprises at least one further monomer unit MS, which in particular is chemically different from the monomer units M1 and M2. In particular there may be two or more different further monomer units MS. As a result, the properties of the block copolymer can be modified further and adapted, for example, in relation to specific applications.

With particular advantage the at least one further monomer unit MS is a monomer unit of the formula III:

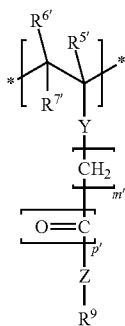

(III)

where
$R^{5'}$, $R^{6'}$, $R^{7'}$, m' and p' are defined like $R^5$, $R^6$, $R^7$, m and p;
Y, in each case independently of any other, is a chemical bond or —O—;
Z, in each case independently of any other, is a chemical bond, —O— or —NH—;
$R^9$, in each case independently of any other, is an alkyl group, cycloalkyl group, alkylaryl group, aryl group, hydroxyalkyl group or an acetoxyalkyl group, in each case having 1-20 C atoms.

Advantage is possessed, for example, by monomer units MS where m'=0, p'=0, Z and Y are a chemical bond, and $R^9$ is an alkylaryl group having 6-10 C atoms.

Also suitable, in particular in the case of monomer units MS for which m'=0, p'=1, Y is —O—, Z is a chemical bond, and $R^9$ is an alkyl group having 1-4 C atoms.

Additionally suitable are monomer unit MS where m' is 0, p' is 1, Y is a chemical bond, Z is —O—, and $R^9$ is an alkyl group and/or a hydroxyalkyl group having 1-6 C atoms.

With particular advantage the at least one further monomer unit MS consists of copolymerized vinyl acetate, styrene and/or hydroxyalkyl (meth)acrylate, more particularly hydroxyethyl acrylate.

The at least one further monomer unit MS may be part of the first block A and/or the second block B. It is also possible for the at least one further monomer unit MS to be part of an additional block of the block copolymer. In the various blocks, in particular, there may be different monomer units MS.

If present in the first block A, the at least one further monomer unit MS in the first block A advantageously has a fraction of 0.001-80 mol %, preferably 20-75 mol %, especially 30-70 mol %, based on all the monomer units in the first block A.

If present in the second block B, the at least one further monomer unit MS in the second block B in particular has a fraction of 0.001-80 mol %, preferably 20-75 mol %, especially 30-70 mol % or 50-70 mol %, based on all the monomer units in the second block B.

According to one advantageous embodiment, in the first block A and/or in the second block B, the at least one further monomer unit MS is present with a fraction of fraction of 20-75 mol %, especially 30-70 mol %, based on all the monomer units in the respective block.

According to a further advantageous embodiment there is at least one further block C arranged between the first block A and the second block B, and this block C differs chemically and/or structurally from the first and from the second blocks.

The at least one further block C advantageously comprises monomer units MS as described above, or consists of such units. In addition to or instead of the monomer units MS, however, there may also be further monomer units present.

More particularly the at least one further block C consists to an extent of at least 50 mol %, more particularly at least 75 mol %, preferably at least 90 mol % or at least 95 mol %, of monomer units MS as described above.

According to one particularly advantageous embodiment, the block copolymer of the invention is a diblock copolymer, consisting of a block A and a block B.

Likewise suitable are block copolymers which comprise at least two blocks of the first block A and/or at least two blocks of the second block B. More particularly these are block copolymers which contain the first block A twice and the second block B once, or are block copolymers which contain the first block A once and the second block B twice. Block copolymers of this kind take the form more particularly of triblock copolymers, tetrablock copolymers or pentablock copolymers, preferably triblock copolymers. In the case of the tetrablock copolymers and the pentablock copolymers there are one or two further blocks present, examples being blocks of block C type as described above.

One particularly advantageous block copolymer has at least one or more of the following features:
(i) block A has 7-40, more particularly 10-25 or 25-35, monomer units M1 and block B has 7-40, more particularly 10-25 or 10-20, monomer units M2.
(ii) the first block A consists, based on all the monomer units in the first block A, to an extent of at least 75 mol %, preferably at least 90 mol %, of monomer unit M1 of the formula I;
(iii) the second block B consists, based on all the monomer units in the second block B, to an extent of at least 75 mol %, preferably at least 90 mol %, of monomer units M2 of the formula II;
(iv) a molar ratio of the monomer units M1 to the monomer units M2 in the block copolymer is in the range from 0.5-6, preferably 0.8-3.5;
(v) $R^1$ is COOM;
(vi) $R^2$ and $R^5$ are H or $CH_3$, preferably $CH_3$;
(vii) $R^3=R^4=R^6=R^7=H$;
(viii) m=0 and p=1;
(ix) X=—O—
(x) $A=C_2$-alkylene and n=10-150, preferably 15-50;
(xi) $R^a$=H or —$CH_3$, preferably $CH_3$;

Especially preferred is a diblock copolymer consisting of blocks A and B that has at least all of the features (i)-(iv). Further preferred here is a diblock copolymer which has all of the features (i)-(xi). Even more preferred is a diblock copolymer which fulfills all of features (i)-(xi) in the versions preferred in each case.

Likewise advantageous is a triblock copolymer consisting of the blocks A, B and C, more particularly in the order A-C-B, where the triblock copolymer has at least all of the features (i)-(iv). Further preferred here is a triblock copolymer which has all of the features (i)-(xi). Even further preferred is a triblock copolymer which fulfills all of the features (i)-(xi) in the versions preferred in each case. Block C in this case advantageously comprises monomer units MS as described above, or block C consists of such units.

In one specific embodiment, moreover, in these diblock copolymers or triblock copolymers, there is additionally a further monomer unit MS as described above in blocks A and B, more particularly a further monomer unit MS of the formula III.

A further aspect of the present invention relates to a process for preparing a block copolymer, comprising a step of
a) polymerizing monomers m1 of the formula IV

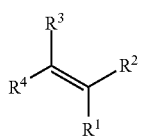

(IV)

and also a step of
b) polymerizing monomers m2 of the formula V

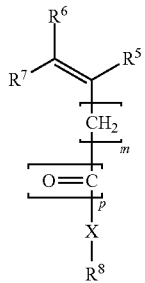

(V)

where $R^1$, $R^2$, $R^3$, $R^4$, $R^5$, $R^6$, $R^7$, $R^8$, K m, p and X are defined as above and where in step a) any fraction of monomer m2 present is less than 25 mol %, more particularly less than or equal to 10 mol %, based on the monomers m1,
and in step b) any fraction of monomer m1 present is less than 25 mol %, more particularly less than or equal to 10 mol %, based on the monomers m2;
and where the steps a) and b) are performed in temporal succession in any order.

The polymerization in step a) is carried out in particular until 75-95 mol %, preferably 85-95 mol %, more particularly 86-92 mol % of the monomers m1 originally introduced have undergone reaction or polymerization.

In particular, the polymerization in step b), accordingly, is carried out until 75-95 mol %, more particularly 80-92 mol %, of the monomers m2 originally introduced have undergone reaction or polymerization.

The conversion of the monomers m1 and m2, or the progress of the polymerization in steps a) and b), can be monitored, for example, by means of liquid chromatography, especially high-performance liquid chromatography (HPLC), in a way which is known per se.

As it has emerged, it is advantageous to react the monomers m1 and m2 in steps a) and b) until the conversion rates specified above have been reached. It is advantageous, moreover, to carry out steps a) and b) immediately following one another, irrespective of the sequence selected. By this means it is possible ideally to maintain the polymerization reaction in steps a) and b).

The process can be carried out, for example, by introducing monomers m1 in a solvent, e.g., water, in step a) and then polymerizing them to form a first block A. As soon as the desired conversion of monomer m1 has been reached (e.g., 75-95 mol %, more particularly 80-92 mol %; see above), without any time delay, monomers m2 are added in step b) and the polymerization is continued. Here, the monomers m2 are added in particular onto the block A already formed, to form a second block B. The polymerization is advantageously continued in turn until the desired conversion rate of monomer m2 has been reached (e.g., 75-95 mol %, more particularly 80-92 mol %; see above). This produces, for example, a diblock copolymer comprising a first block A and, connected to it, a second block B.

According to a further advantageous embodiment, in step a) and/or in step b), there is at least one further polymerizable monomer ms. The at least one further polymerizable monomer ms in this case is polymerized in particular with the monomer m1 and/or the monomer m2.

It is also possible, however, in addition to step a) and step b), to provide a further step c) of the polymerization of the at least one further polymerizable monomer ms. By this means it is possible to prepare a block copolymer having an additional block C. In particular, in terms of time, step c) is carried out between step a) and step b). The additional block C, accordingly, is arranged physically between the blocks A and B.

The at least one further polymerizable monomer ms, independently of how it is integrated into the block copolymer, is more particularly a monomer of the formula VI

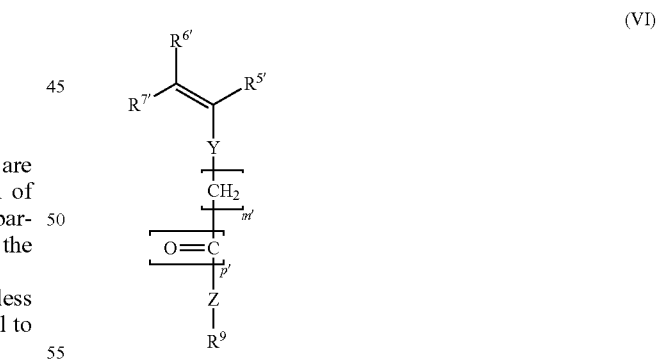

(VI)

where
$R^{5'}$, $R^{6'}$, $R^{7'}$, $R^9$, m', p', Y and Z are as defined above.

Advantageous fractions, proportions, and embodiments of the monomers m1, m2, ms and of any further monomers, correspond to the fractions, proportions, embodiments already stated above, described in connection with the monomer units M1, M2 and MS.

With particular advantage the at least one further monomer ms is selected from vinyl acetate, styrene, N-vinylpyrrolidone and/or hydroxyalkyl (meth)acrylate, more particularly hydroxyethyl acrylate.

The polymerization in step a) and/or in step b) takes place preferably in an aqueous solution. More particularly, the polymerizations in both steps a) and b) take place in aqueous solutions. This is also the case, correspondingly, for step c), where such a step is carried out. As it has emerged, this has positive consequences for the dispersing effect of the block copolymer.

It is, however, also possible to provide other solvents, ethanol being an example.

The polymerization in step a) and/or b) takes place with advantage by a free radical polymerization, preferably by a living radical polymerization, more particularly by reversible addition-fragmentation chain transfer polymerization (RAFT). This is also true, accordingly, of step c), where such a step is carried out.

Employed as initiator for the polymerizations in particular is a radical initiator, preferably an azo compound and/or a peroxide. Suitable peroxides are selected for example from the group consisting of dibenzoyl peroxide (DBPO), di-tert-butyl peroxide, and diacetyl peroxide.

A particularly advantageous initiator is an azo compound, such as azobisisobutyronitrile (AIBN) or azobisisobutyramidine (AIBA), for example. In certain circumstances, however, other radical initiators, such as sodium persulfate or di-tert-butyl hyponitrite, may also be used.

Present preferably in step a) and/or in step b) are one or more representatives from the group consisting of dithioesters, dithiocarbamates, trithiocarbonates and xanthates. These are so-called "RAFT agents", which make it possible to control the polymerization process. This is also true, correspondingly, for step c), where such a step is carried out.

The polymerization in step a), step b) and/or step c) takes place more particularly at a temperature in the range 50-95° C., especially 70-90° C.

It is advantageous to operate under an inert gas atmosphere, as for example under a nitrogen atmosphere.

In the case of one particularly preferred process, step b) is performed before step a).

According to an advantageous process, step b) is performed before step a) and there are no other polymerization steps anymore. In this way, simply, a diblock copolymer is obtainable.

A further aspect of the invention relates to the use of a block copolymer as described above as a dispersant for mineral binder compositions.

The block copolymer may be employed in particular for plasticizing, for water reduction and/or for improving the workability of a mineral binder composition.

The block copolymer more particularly may be used to extend the workability of a mineral binder composition.

The present invention further relates, moreover, to a mineral binder composition comprising at least one block copolymer as described above.

The mineral binder composition comprises at least one mineral binder. The expression "mineral binder" refers in particular to a binder which reacts in the presence of water in a hydration reaction to form solid hydrates or hydrate phases. This may be, for example, a hydraulic binder (e.g., cement or hydraulic lime), a latent hydraulic binder (e.g., slag), a pozzolanic binder (e.g., fly ash), or a nonhydraulic binder (gypsum or white lime).

More particularly the mineral binder or the binder composition comprises a hydraulic binder, preferably cement. Particularly preferred is a cement having a cement clinker fraction of ≥35 wt %. The cement more particularly is of type CEM I, CEM II, CEM III, CEM IV or CEM V (in accordance with standard EN 197-1). The fraction of the hydraulic binder in the mineral binder as a whole is advantageously at least 5 wt %, more particularly at least 20 wt %, preferably at least 35 wt %, especially at least 65 wt %. According to a further advantageous embodiment, the mineral binder consists to an extent of ≥95 wt % of hydraulic binder, more particularly of cement or cement clinker.

It may, however, also be advantageous for the mineral binder or mineral binder composition to comprise or consist of other binders. These are, in particular, latent hydraulic binders and/or pozzolanic binders. Examples of suitable latent hydraulic and/or pozzolanic binders are slag, fly ash and/or silica dust. The binder composition may also comprise inert substances such as limestone, finely ground quartzes and/or pigments, for example. In one advantageous embodiment the mineral binder comprises 5-95 wt %, more particularly 5-65 wt %, very preferably 15-35 wt %, of latent hydraulic and/or pozzolanic binders. Advantageous latent hydraulic and/or pozzolanic binders are slag and/or fly ash.

In one particularly preferred embodiment the mineral binder comprises a hydraulic binder, more particularly cement or cement clinker, and a latent hydraulic and/or pozzolanic binder, preferably slag and/or fly ash. The fraction of the latent hydraulic and/or pozzolanic binder in this case is more preferably 5-65 wt %, more preferably 15-35 wt %, while at least 35 wt %, especially at least 65 wt %, of the hydraulic binder is present.

The mineral binder composition is preferably a mortar or concrete composition.

The mineral binder composition is in particular a mineral binder composition which can be made up with water and/or is workable.

The weight ratio of water to binder in the mineral binder composition is preferably in the range of 0.25-0.7, more particularly 0.26-0.65, preferably 0.27-0.60, especially 0.28-0.55.

The block copolymer is used advantageously with a fraction of 0.01-10 wt %, more particularly 0.1-7 wt % or 0.2-5 wt %, based on the binder content. The fraction of the block copolymer in this case is based on the block copolymer per se. In the case of a block copolymer in the form of a solution, accordingly, it is the solids content which is critical.

An additional aspect of the present invention pertains to a shaped article, more particularly a constituent of a construction, obtainable by fully curing a mineral binder composition as described above, comprising a block copolymer, following addition of water.

The construction may be, for example, a bridge, a building, a tunnel, a roadway, or a runway.

Further advantageous embodiments of the invention are apparent from the working examples hereinafter.

BRIEF DESCRIPTION OF THE DRAWING

The FIGURE, which is used for elucidating the working examples, shows the heat profile of mortar mixtures admixed on tempering with a dispersant in the form of a diblock copolymer P1 (solid line), of a random polymer P2 prepared by radical copolymerization (dotted line), and of a random polymer P3 prepared by polymer-analogous esterification (dashed line).

WORKING EXAMPLES

1. Preparation Examples for Polymers 1.1 Diblock Copolymer P1 (n=20; M1/M2=1; RAFT)

For the preparation of a diblock copolymer P1 by RAFT polymerization, a round-bottom flask equipped with a reflux condenser, agitator, thermometer, and inert gas inlet tube was charged with 57.4 g of 50% methoxy-polyethylene glycol$_{1000}$ methacrylate (0.03 mol; average molecular weight: 1000 g/mol; ~20 ethylene oxide units/molecule) and 18.4 g of deionized water. The reaction mixture was heated to 80° C. with vigorous stirring. A gentle stream of inert gas (N$_2$) was passed through the solution during heating and for the whole of the rest of the reaction time.

Added to the mixture then were 273 mg of 4-cyano-4-(thiobenzoyl)pentanoic acid (0.85 mmol; RAFT agent). When the substance had fully dissolved, 42 mg of AIBN (0.26 mmol; initiator) were added. From this point on the conversion was ascertained regularly by HPLC.

As soon as the conversion, based on methoxy-polyethylene glycol methacrylate, was more than 80 mol %, 2.33 g of methacrylic acid (0.03 mol) were added to the reaction mixture. The mixture was reacted for a further 4 h and then left to cool. This left a clear, slightly reddish, aqueous solution having a solids content of around 40 wt %. The molar ratio of methacrylic acid to methoxy-polyethylene glycol methacrylate is 1.

1.2 Random Polymer P2 (Comparative Example; n=20; M1/M2=1; RAFT)

For comparison purposes, a second polymer P2 was prepared with random or statistical monomer distribution. The procedure here was analogous to that for the preparation of polymer P1 (preceding section), but the methacrylic acid was included in the initial charge together with the methoxy-polyethylene glycol1000 methacrylate. The solids content of the polymer P2 is again around 40 wt %.

1.3 Random Polymer P3 (Comparative Example; n=20; M1/M2=1; PAE)

Likewise for comparison purposes, a further polymer P3 was prepared with random or statistical monomer distribution. In the case of polymer P3, however, preparation took place by polymer-analogous esterification (PAE). The procedure here is essentially as described in EP 1 138 697 B1 at page 7 line 20 to page 8 line 50 and also in the examples specified therein. Specifically, a polymethacrylic acid was esterified with methoxy-polyethylene glycol$_{1000}$ (unilaterally methoxy-terminated polyethylene glycol having an average molecular weight of 1000 g/mol; ~20 ethylene oxide units/molecule), to result in a molar ratio of methacrylic acid units to ester groups of 1 (M1/M2=1). The solids content of the polymer P3 is again around 40 wt %.

1.4 Diblock Copolymer P4 (n=9; M1/M2=1; RAFT; H$_2$O)

Diblock copolymer P4 was prepared in the same way as for diblock copolymer P1, but using, rather than methoxy-polyethylene glycol$_{1000}$ methacrylate, the corresponding amount of methoxy-polyethylene glycol$_{400}$ methacrylate (average molecular weight: 400 g/mol; ~9 ethylene oxide units/molecule). The solids content of the polymer P4 is again around 40 wt %.

1.5 Diblock Copolymer P5 (n=9; M1/M2=1; RAFT; EtOH)

Diblock copolymer P5 was prepared in the same way as for diblock copolymer P4, but using, instead of water, the corresponding amount of ethanol as solvent. The solids content of the polymer P5 is again around 40 wt %.

1.6 Diblock Copolymer P6 (n=20; M1/M2=3; RAFT)

Diblock copolymer P6 was prepared in the same way as for diblock copolymer P1, but the amounts of methacrylic acid and methoxy-polyethylene glycol$_{1000}$ methacrylate used were adapted such that the molar ratio of methacrylic acid to methoxy-polyethylene glycol methacrylate for the same molecular weight of the diblock copolymer is 3. The solids content of the polymer P6 is around 40 wt %.

1.7 Diblock Cool Mer P7 (n=9. M1/M2=3; RAFT; H$_2$O)

Diblock copolymer P7 was prepared in the same way as for diblock copolymer P6, but using, rather than methoxy-polyethylene glycol$_{1000}$ methacrylate, the corresponding methoxy-polyethylene glycol$_{400}$ methacrylate (average molecular weight: 400 g/mol; ~9 ethylene oxide units/molecule). The solids content of the polymer P7 is again around 40 wt %.

1.8 Diblock Copolymer P8 (n=9; M1/M2=3; RAFT; EtOH)

Diblock copolymer P8 was prepared in the same way as for diblock copolymer P7, but using, instead of water, the corresponding amount of ethanol as solvent. The solids content of the polymer P6 is likewise around 40 wt %.

1.9 Overview of Polymers

Table 1 provides an overview of the polymers prepared and used below.

TABLE 1

Polymers prepared

| No. | Structure | n | M1/M2 | Solvent | Preparation method |
|---|---|---|---|---|---|
| P1 | Diblock | 20 | 1 | Water | RAFT |
| P2 | Random | 20 | 1 | Water | RAFT |
| P3 | Random | 20 | 1 | Water | PAE |
| P4 | Diblock | 9 | 1 | Water | RAFT |
| P5 | Diblock | 9 | 1 | Ethanol | RAFT |
| P6 | Diblock | 20 | 3 | Water | RAFT |
| P7 | Diblock | 9 | 3 | Water | RAFT |
| P8 | Diblock | 9 | 3 | Ethanol | RAFT |

2. Mortar Mixtures

2.1 Preparation

The mortar mixture used for test purposes has the dry composition described in table 2:

TABLE 2 dry composition of mortar mixture

| Component | Amount [g] |
|---|---|
| Cement (CEM I 42.5 N; Normo 4; available from Holcim Switzerland) | 750 g |

TABLE 2-continued dry composition of mortar mixture

| Component | Amount [g] |
|---|---|
| Limestone filler | 141 g |
| Sand 0-1 mm | 738 g |
| Sand 1-4 mm | 1107 g |
| Sand 4-8 mm | 1154 g |

In order to make up a mortar mixture, the sands, the limestone filler and the cement were mixed dry in a Hobart mixer for 1 minute. Over the course of 30 seconds, the tempering water (for amounts in table 3), admixed beforehand with the respective polymer (cf. table 3), was added, and mixing was continued for 2.5 minutes. The total wet mixing time lasted 3 minutes in each case.

2.2 Mortar Tests

To determine the dispersing effect of the polymers, the flow value (ABM) of fresh mortar mixtures was measured in each case at various times. The flow value (ABM) of the mortar was determined in accordance with EN 1015-3.

Further, the effect of the polymers on the hydration behavior of mineral binder compositions was ascertained by measuring the temperature profile of mortar mixtures over time, after having been made up with water. The temperature measurement took place under adiabatic conditions, using a thermocouple as temperature sensor, in a conventional way. All the samples were measured under the same conditions. The measure taken for the solidification time in the present case is the time [t(TM)] which elapses from the making-up of the mortar mixture through to the attainment of the temperature maximum occurring after the induction phase or resting phase (cf. the FIGURE).

3. Results of the Mortar Tests

Table 3 gives an overview of the mortar tests conducted (T1-T12) and the results obtained in the tests. Test R is a blank test carried out for comparative purposes, without addition of polymer.

TABLE 3

Mortar test results

| No. | Polymer | Level of addi-tion* [wt %] | w/c** | ABM# [mm] after | | | | t (TM) [h:min] |
|---|---|---|---|---|---|---|---|---|
| | | | | 0 min | 30 min | 60 min | 90 min | |
| R | — | — | — | <120 | n.m. | n.m. | n.m. | — |
| T1 | P1 | 0.5 | 0.435 | 179 | 150 | 146 | 139 | 8:51 |
| T2 | P2 | 0.5 | 0.435 | 126 | 116 | n.m. | n.m. | 10:10 |
| T3 | P3 | 0.5 | 0.435 | 128 | 124 | 121 | n.m. | 10:08 |
| T4 | P1 | 0.6 | 0.450 | 233 | 226 | 205 | 193 | — |
| T5 | P2 | 0.6 | 0.450 | 132 | 125 | 123 | n.m. | — |
| T6 | P3 | 0.6 | 0.450 | 136 | 130 | 130 | 127 | — |
| T7 | P1 | 0.5 | 0.450 | 225 | 148 | 131 | n.m. | — |
| T8 | P4 | 0.5 | 0.450 | 145 | 129 | n.m. | n.m. | — |
| T9 | P5 | 0.5 | 0.450 | 131 | 134 | n.m. | n.m. | — |
| T10 | P6 | 0.5 | 0.450 | 225 | 224 | 207 | 179 | — |
| T11 | P7 | 0.5 | 0.450 | 150 | 134 | n.m. | n.m. | — |
| T12 | P8 | 0.5 | 0.450 | 131 | 124 | n.m. | n.m. | — | n.m. = not measurable
*= weight fraction of polymer solution based on cement content
**= weight ratio of water to cement
= flow value as per EN 1015-3. The time "0 min" corresponds to the first measurement immediately after the mortar sample was made up.

A comparison of tests T1-T3 shows that with polymer P1, based on a diblock structure, under identical conditions, the plasticizing effect achieved is greater and longer-lasting than with the analogous but randomly constructed polymers P2 and P3. The same pattern emerges on comparative tests T4-T6, which were carried out with a high level of addition and a high water content.

Moreover, with polymer P1, the temperature maximum occurs after just 8:51 h, whereas the maximum when using the other two polymers, P2 and P3, occur not until about 1:20 h later. In terms of the delay in the hydration profile and in the setting, therefore, polymer P1 is more advantageous.

In tests T7 and T8 it is apparent that polymer P1, with the longer side chains or a larger value of "n" (=number of ethylene oxide units in monomer unit M2; n=20 for P1), is more advantageous in terms of the plasticizing effect by comparison with polymer P4, which has much shorter side chains (n=9). From contrasting tests T8 and T9, moreover, it is apparent that the use of water (H₂O) as solvent during the polymerization is more advantageous than the use of ethanol.

Corresponding results are also found for the polymers P6-P8 used in tests T10-T12.

From a comparison of tests T7 and T10, furthermore, it can be concluded that the initially approximately equal plasticizing effect of polymer P6, with a ratio of M1/M2=3, can be maintained more effectively over time than the polymer P1, which possesses a ratio of M1/M2=1.

From the results presented, therefore, the conclusion is that in a variety of respects the polymers of the invention are advantageous over known polymers. In particular, with the polymers of the invention, even at relatively low levels of addition, high dispersing effects and plasticizing effects can be achieved, and can also be maintained for a comparatively long time at a level which is of interest for practice. Moreover, the polymers of the invention are also very advantageous in relation to the delay problem.

The embodiments described above, however, should be understood merely as illustrative examples, which may be modified as desired within the scope of the invention.

The invention claimed is:

1. A block copolymer having effectiveness as a dispersant for mineral binder compositions comprising at least one first block A and at least one second block B, the first block A having a monomer unit M1 of the formula I,

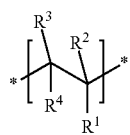

and the second block B containing a monomer unit M2 of the formula II

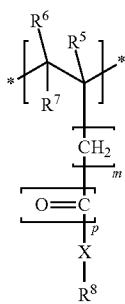

(II)

where

R[1], in each case independently of any other, is —COOM, —SO$_2$—OM, —O—PO(OM)$_2$ and/or —PO(OM)$_2$, R[2], each independently of one another, are H or a methyl group, R[3], R[5] and R[6], each independently of one another, are H or an alkyl group having 1 to 5 carbon atoms, R[4] and R[7], each independently of one another, are H, —COOM or an alkyl group having 1 to 5 carbon atoms, or where R[1] with R[4] forms a ring to —CO—O—CO—, M, in each case independently of any other, is H$^+$, an alkali metal ion, an alkaline earth metal ion, a di- or trivalent metal ion, or an ammonium ion;

m=0, 1 or 2, p=0 or 1,

X, in each case independently of any other, is —O— or —NH—,

R[8] is a group of the formula -[AO]$_n$—R$^a$, where A=C$_2$- to C$_4$-alkylene, R$^a$ is H, or a C$_1$- to C$_{20}$-alkyl group, -cyclohexyl group or alkylaryl group, and n is 45-250;

and where any fraction of monomer units M2 present in the first block A is less than 25 mol % based on all the monomer units M1 in the first block A, and where any fraction of monomer units M1 present in the second block B is less than 25 mol % based on all the monomer units M2 in the second block B, wherein:

block A has 7-40 monomer units M1 and block B has 7-40 monomer units M2;

the first block A consists of, based on all the monomer units in the first block A, at least 75 mol % of monomer unit M1 of the formula I;

the second block B consists of, based on all the monomer units in the second block B, at least 75 mol % of monomer units M2 of the formula II;

a molar ratio of the monomer units M1 to the monomer units M2 in the block copolymer is in the range from 0.8-3.5.

2. The block copolymer as claimed in claim 1, wherein the first block A comprises 25-35 monomer units M1 and/or the second block B comprises 10-20 monomer units M2.

3. The block copolymer as claimed in claim 1, wherein the block copolymer comprises at least one further monomer unit MS:

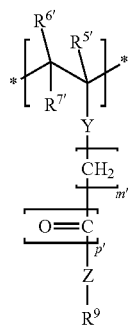

(III)

where

R[5'], R[6'], R[7'], m' and p' have the same definitions as R[5], R[6], R[7], m and p, respectively;

Y, in each case independently of any other, is a chemical bond or —O—;

Z, in each case independently of any other, is a chemical bond, —O— or —NH—;

R[9], in each case independently of any other, is an alkyl group, cycloalkyl group, alkylaryl group, aryl group, hydroxyalkyl group or an acetoxyalkyl group, in each case having 1-20 C atoms.

4. The block copolymer as claimed in claim 1, wherein R[1]=COOM; R[2] and R[5], independently of one another, are H, —CH$_3$ or mixtures thereof; R[3] and R[6], independently of one another, are H or —CH$_3$; R[4] and R[7], independently of one another, are H or —COOM; and X for at least 75 mol % of all monomer units M2, is —O—.

5. The block copolymer as claimed in claim 1, wherein n=45-150.

6. The block copolymer as claimed in claim 1, wherein it is a diblock copolymer, consisting of a block A and a block B.

7. A process for preparing a block copolymer as claimed in claim 1, comprising a step of a) polymerizing monomers m1 of the formula IV

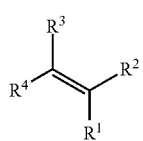

(IV)

and also a step of b) polymerizing monomers m2 of the formula V

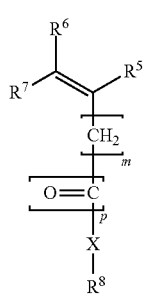

(V)

where $R^1$, $R^2$, $R^3$, $R^4$, $R^5$, $R^6$, $R^7$, $R^8$, m, p and X are defined as in claim 1 and where in step a) any fraction of monomer m2 present is less than 25 mol % based on the monomers m1, and in step b) any fraction of monomer m1 present is less than 25 mol % based on the monomers m2;

and where the steps a) and b) are performed in temporal succession in any order.

8. The process as claimed in claim 7, wherein the polymerization is accomplished by reversible addition-fragmentation chain transfer polymerization (RAFT).

9. The process as claimed in claim 7, wherein the polymerization in step a) is carried out until 75-95 mol % of the monomers m1 originally introduced have undergone reaction or polymerization, and/or wherein the polymerization in step b) is carried out until 75-95 mol % of the monomers m2 originally introduced have undergone reaction or polymerization.

10. The process as claimed in claim 7, wherein in step a) and/or in step b) there is at least one further polymerizable monomer ms

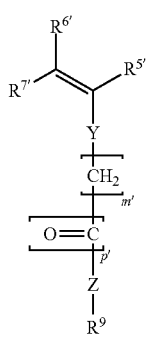

(VI)

where $R^{5'}$ and $R^{6'}$ each independently of one another, are H or an alkyl group having 1 to 5 carbon atoms, $R^{7'}$ in each case independently of any other, is H, -COOM or an alkyl group having 1 to 5 carbon atoms, m'=0, 1 or 2, and p'=0 or 1;

Y, in each case independently of any other, is a chemical bond or -O-;

Z, in each case independently of any other, is a chemical bond, -O- or -NH-;

$R^9$, in each case independently of any other, is an alkyl group, cycloalkyl group, alkylaryl group, aryl group, hydroxyalkyl group or an acetoxyalkyl group, in each case having 1-20 C atoms.

11. A method for water reduction and/or for extending the workability of a mineral binder composition comprising adding the block copolymer as claimed in claim 1 as a dispersant to the mineral binder composition.

12. A mineral binder composition comprising at least one block copolymer as described in claim 1.

13. A shaped article obtainable by fully curing a mineral binder composition as claimed in claim 12 following addition of water.

14. The block copolymer as claimed in claim 1, wherein any fraction of monomer units M2 present in the first block A is less than or equal to 10 mol %, based on all the monomer units M1 in the first block A, and wherein any fraction of monomer units M1 present in the second block B is less than or equal to 10 mol %, based on all the monomer units M2 in the second block B.

15. The block copolymer as claimed in claim 1, wherein a molar ratio of the monomer units M1 to the monomer units M2 is in the range of 2-3.5.

16. The block copolymer as claimed in claim 1, wherein the first block A, based on all the monomer units in the first block A, consists of at least 90 mol % of monomer units M1 of the formula I and/or the second block B, based on all the monomer units in the second block B, consists of at least 90 mol % of monomer units M2 of the formula II.

17. The block copolymer as claimed in claim 1, wherein $R^1$ is COOM;
$R^2$ and $R^5$ are H or $CH_3$;
$R^3$=$R^4$=$R^6$=$R^7$=H;
m=0 and p=1;
X=—O—;
A=$C_2$-alkylene and n=45-50;
$R^a$=H or —$CH_3$.

18. The block copolymer as claimed in claim 1, wherein first block A is methacrylic acid and second block B is a methoxy-polyethylene glycol methacrylate.

19. The block copolymer as claimed in claim 1, wherein the block copolymer does not comprise a further monomer unit MS:

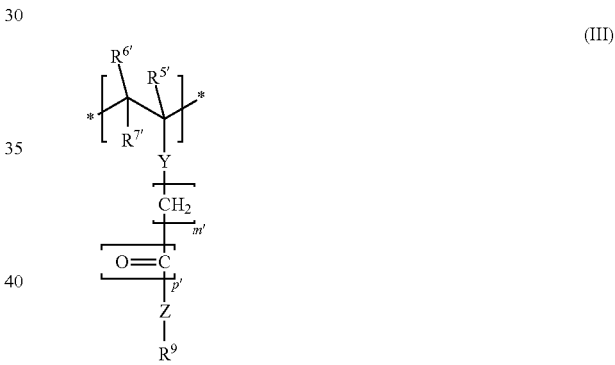

(III)

where $R^{5'}$, $R^{6'}$, $R^{7'}$, m' and p' have the same definitions as $R^5$, $R^6$, $R^7$, m and p, respectively;

Y, in each case independently of any other, is a chemical bond or —O—;

Z, in each case independently of any other, is a chemical bond, —O— or —NH—;

$R^9$, in each case independently of any other, is an alkyl group, cycloalkyl group, alkylaryl group, aryl group, hydroxyalkyl group or an acetoxyalkyl group, in each case having 1-20 C atoms.

20. A mineral binder composition comprising at least one block copolymer as described in claim 3.

21. The block copolymer as claimed in claim 1, wherein the block copolymer consists of at least one first block A and at least one second block B, and one or more additional blocks obtained by free radical polymerization of an unsaturated monomer.

* * * * *